United States Patent [19]

Roberts et al.

[11] Patent Number: 4,739,872
[45] Date of Patent: Apr. 26, 1988

[54] AUTOMATED PARTS HANDLING APPARATUS

[75] Inventors: Kenneth W. Roberts, Pryor; Jack A. Patty, Sapulpa, both of Okla.

[73] Assignee: AMSTED Industries Incorporated, Chicago, Ill.

[21] Appl. No.: 22,063

[22] Filed: Mar. 5, 1987

[51] Int. Cl.⁴ .............................................. B65G 47/00
[52] U.S. Cl. ................................. 198/346.2; 29/38 B; 82/2.7; 198/379; 414/224; 414/225; 414/748; 414/786
[58] Field of Search .............. 414/224, 225, 736, 786, 414/783, 745, 748; 198/346.1, 379, 412, 468.2, 346.2, 950; 901/6; 82/2.5, 2.7, DIG. 5; 29/38 B, 38 A

[56] References Cited

U.S. PATENT DOCUMENTS 4,302,144  11/1981  Hallqvist ........................... 82/2.5 X
4,479,754  10/1984  Inaba et al. ...................... 414/736 X

FOREIGN PATENT DOCUMENTS 1314746  4/1963  France ............................. 414/736 X
1033309  8/1983  U.S.S.R. .......................... 414/224 X Primary Examiner—Robert J. Spar
Assistant Examiner—Donald W. Underwood
Attorney, Agent, or Firm—Edward J. Brosius; Charles E. Bouton

[57] ABSTRACT

A parts handling apparatus is provided for moving parts from a pick up and loading station into a machining station. A parts supply and feeding device is mounted on a main frame adjacent a parts turnaround device also mounted on the main frame. A swing arm assembly is rotatably mounted to the frame and includes two arm chucks at the end of the swing arm opposite the rotatably mounted end. The swing arm chucks are themselves capable of rotation so as to load and unload parts from the parts feeding device and the parts turnaround device as well as to deliver parts to the machining station.

11 Claims, 2 Drawing Sheets

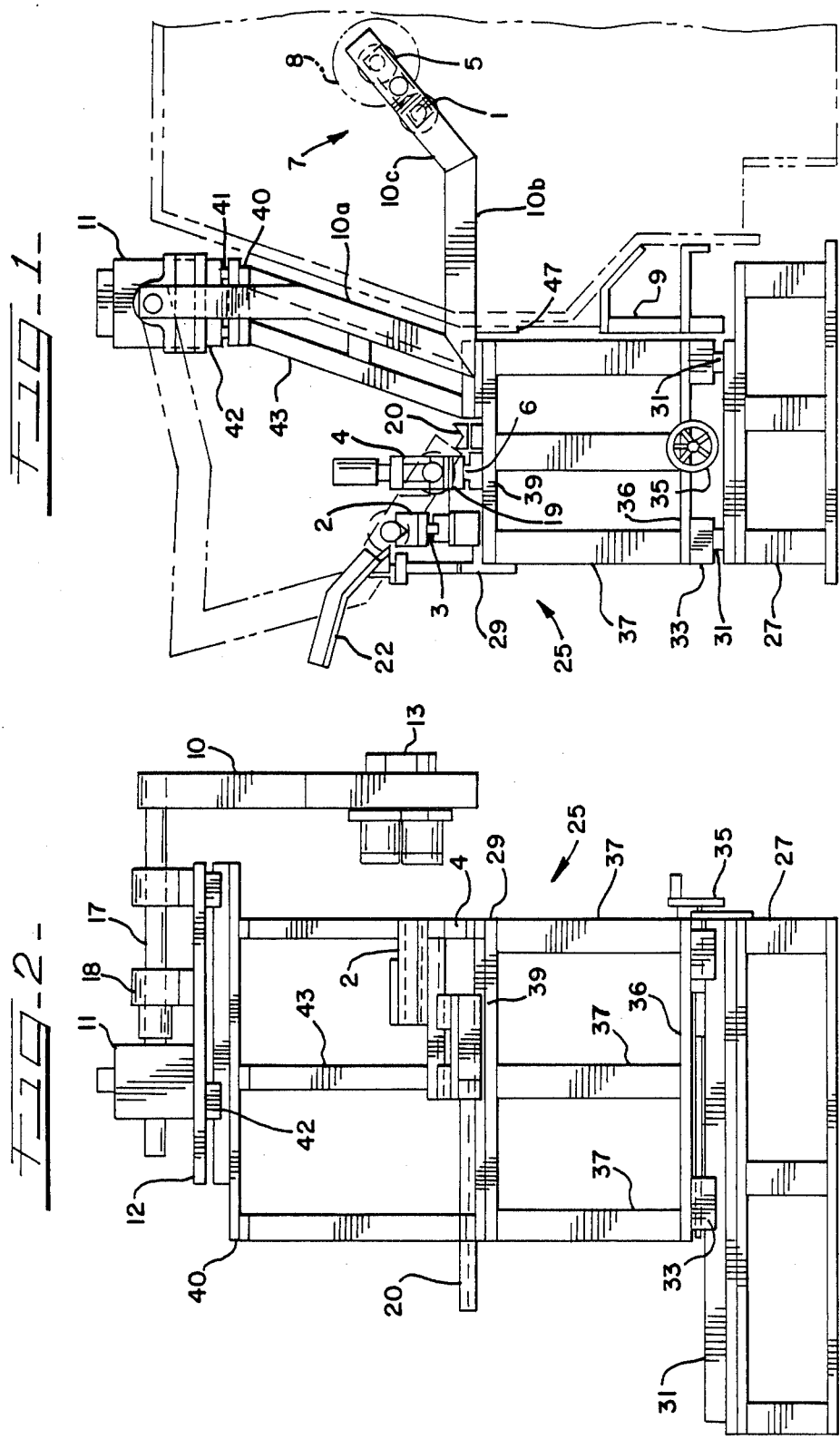

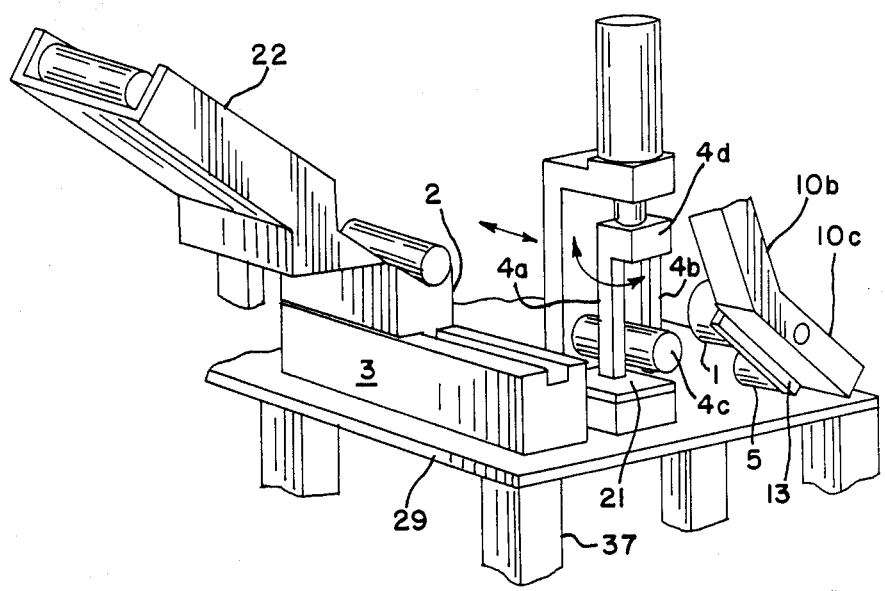
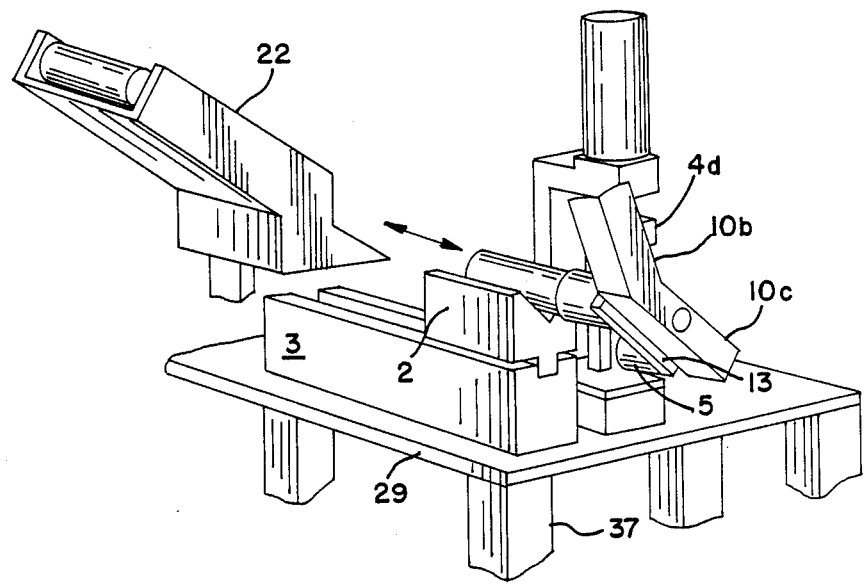

AUTOMATED PARTS HANDLING APPARATUS

BACKGROUND OF THE INVENTION

The present invention relates to parts handling apparatus and, more particularly, to an apparatus and a method for moving parts from a supply and turnaround station to and from a machining station.

There are a great number of parts handling arms and robots in use in industry today. These devices include one, two or more arms adapted to pick up parts from one location and deliver them to another location. In some cases, due to the fixed length of the arm or arms, only one physical location at each loading or unloading station can be served by the particular arm. In a machining operation, such as a lathe, where high speed cutting of parts occurs, it is desirable to provide a parts handling arm which can both pick up a part which has been machined and insert a new part for machining in the same arm movement. It is also desirable in such operations to be able to withdraw the arm from the high speed machining location so that such machining operations can be closed off for protection of surrounding men and machinery.

SUMMARY OF THE INVENTION

It is an object of the present invention to provide a parts handling apparatus capable of loading and unloading parts to be machined from a loading station to and from a machining station. It is an additional object of the present invention to provide such a parts handling apparatus wherein the loading station includes a part supply feeder and a parts turnaround device.

The present invention provides an apparatus and method for parts handling to and from a machining station. A single swing arm is mounted on a frame assembly so as to be able to rotate between a parts loading station at a full rearward rotation of the swing arm and a machining station at a full forward rotated position. The end of the swing arm opposite its rotation point connection to the frame includes two chucks capable of holding parts to be machined. When at the loading station, one chuck is positioned at a parts supply feeding station wherein a new part can be placed in the chuck. The other chuck is simultaneously positioned at a turnaround and unloading station wherein a machined part can be unloaded from this chuck for either removal from the machine as a completed part or else end to end turnaround of the part for machining of the second end of the part. The two chucks at the end of the swing arm are themselves mounted on a rotating unit capable of, upon 180° rotation, interchanging the positions of the two chucks. Accordingly, when the swing arm is fully forwardly rotated to the machining station, an empty chuck can receive a machined part and, upon rotation of the chucks, a part to be machined can be inserted into the machining station while the swing arm remains at the machining station. Upon rotation of the swing arm rearwardly from the machining station, a door is typically provided to close the machining device such as a lathe from the parts handling apparatus thereby protecting such apparatus and the operator from any damage or injury due to high speed particles from the machining operation.

BRIEF DESCRIPTION OF THE DRAWINGS

In the drawings,

FIG. 1 is a side view of the parts handling device of the present invention;

FIG. 2 is a front view of the parts handling device of the present invention;

FIG. 3 is a detailed perspective view of the chuck arm rotation device and the parts turnaround/unloading device;

FIG. 4 is a detailed perspective view of the chuck rotation end of the swing arm and the part supply feeding device.

DESCRIPTION OF THE PREFERRED EMBODIMENT

Referring now to FIGS. 1 and 2 of the drawings, an embodiment of the parts handling device of the present invention is shown generally at 25. A base unit is shown generally at 27 which includes upper platform supporting rails 31. The main frame of parts handling device 25 is shown generally at 29. Main frame 29 is supported on four legs 33 adapted to rest on and slide across rails 31. A hand crank 35 is provided with appropriate mechanism to provide for the lateral movement of main frame 29 across rails 31. Main frame 29 includes support legs 37 extending upwardly from lower frame 36 which spans legs 33. Center table 39 forms a base for certain other components of parts handling device 25 and is supported by legs 37.

Parts load chute 22 is supported on table 39 and is adapted to hold a series of parts to be machined. Such parts are usually cylindrical and accordingly would roll by gravity downwardly along parts chute 22 to parts feeding station 2. Parts feeding station 2 is mounted on a linear bearing 3 which in turn is mounted to center table 39. Accordingly, parts feeder 2 is laterally movable by appropriate equipment along linear bearing 3. A detailed view of parts feeder 2 is shown in FIG. 4 wherein the part is shown exiting from load chute 22 to feed station 2.

Parts turnaround and unloading device 4 is shown in FIGS. 1 and 2 and is shown in detail in FIG. 3. Turnaround device 4 includes depending arms 4a and 4b adapted to grip a part 4c. Arms 4a and 4b extend from a base unit 4d which itself is rotatably mounted on main frame 29. Accordingly, by rotation of unit 4d, arms 4a and 4b can be rotated 180°, and accordingly, a part held by the compression of arms 4a and 4b can be rotated, from end to end. Unloading station at the end of a linear bearing 6 includes a device whereby, upon release of a completed part from arms 4a and 4b and unit 4d moves back, the part can be transferred to the exit vibratory conveyor 20. Parts turnaround device 4 is itself mounted on table 39 by means of the linear bearing 6 which permits lateral movement of parts turnaround device 4 across table 39. An inspection transfer table 21 is also provided from parts turnaround device 4 in the event it is desired to deposit a part 4c for inspection thereon.

An upper table of parts handling device 25 is supported by legs 43 extending upwardly from table 29. Table 40 includes rails 41 upon which legs 42 of shuttle mechanism 12 are adapted to be supported and slide laterally across. Shuttle mechanism 12 includes a rotation device 11 having a drive shaft 17 extending outwardly therefrom and supported in bearings 18 extending upwardly from the base of shuttle mechanism 12. Swing arm 10 has an opening at one end thereof adapted to receive shaft 17. The other end of swing arm 10 includes load chucks 1 and 5 mounted to swing arm by rotation unit 13. Swing arm 10 comprises a first section 10a extending from shaft 17, a second section 10b extending from first section 10a at an acute angle of less than 90°, and a third or end section 10c to which rotation unit 13 and load chucks 1 and 5 are connected. Load chucks 1 and 5 and rotation unit 13 can best be seen in FIG. 4, wherein the end section 10c of swing arm 10 is seen to receive rotation unit 13 therethrough. Rotation unit 13 includes a plate 13a to which load chucks 1 and 5 are affixed. Upon activation of rotation unit 13, plate 13a can be rotated thereby transferring the positions of load chucks 1 and 5 by 180°. Referring to FIG. 4, it is seen that when feed station 2 is laterally moved toward the right when viewing FIG. 2 and turnaround device 4 is also laterally moved toward the right, a new part can be received at load chuck 1 while a machined part can be removed from load chuck 5 simultaneously.

Referring now to FIG. 1, swing arm 10 is shown in solid lines at a machining station shown generally at 7 when swing arm 10 is rotated fully forwardly. At such position of swing arm 10, load chuck 5 can receive a machined part from machining chuck 8. With swing arm 10 at machining station 7, upon rotation of chuck rotating unit 13, load chucks 5 and 1 can reverse their positions thereby bringing load chuck 1 into alignment with machining chuck 8. Thereby a part to be machined can be inserted into machining chuck 8 without movement of swing arm 10 from its fully forward position at machining station 7. Note that door 47 has been opened to permit swing arm 10 to enter machining station 7. Upon the necessary transfer of parts at machining station 7, swing arm 10 can be rotated fully rearwardly to the loading station position shown in dashed lines in FIG. 1. Therein the appropriate unloading of parts from load chucks 1 and 5 and the provision of new parts to be machined from parts supply 2 can be accomplished. A detailed description of the operation of the apparatus and method of the present invention follows.

SEQUENCE OF OPERATION

Loader chuck 1 picks up a new part from feeder 2 which is then moved clear to the left in FIG. 2 via linear way bearing 3. Turnaround/unloader device 4 simultaneously picks up a half completed part from unload chuck 5, and then turnaround/unload device 4 is moved back clear to the left via linear way bearing 6. Turnaround/unload device 4 rotates part end to end 180° by the rotation of arms 4a, 4b by main unit 4d. Machining device or lathe 7 has been running the second end of a part and is now stopped with a completed part in lathe chuck 8. Access door 47 opens via air cylinder 9, and swing arm 10 is rotated by unit 11 to line up unload chuck 5 with lathe chuck 8. Shuttle mechanism 12 moves swing arm 10 to the left, and unload chuck 5 closes on completed part and lathe chuck 8 opens. Shuttle mechanism 12 moves swing arm to the right, and unit 13 rotates 180° to change position of load and unload chucks 1 and 5. Shuttle mechanism 12 moves swing arm 10 to left, and load chuck 1 opens releasing new part while lathe chuck 8 closes on new part. Shuttle mechanism 12 moves swing arm 10 to right, and swing arm 10 is then rotated by unit 11 to line up load chuck 1 with turnaround/unload device 4 and unload chuck 5 with feeder 2. Access door 47 closes via air cylinder 9 and lathe 7 begins running first end of new part.

Turnaround/unload device 4 which is still holding a half completed part shuttles right via linear way bearing 6. Swing arm 10 is shuttled left via shuttle mechanism 12, and load chuck 1 closes on part and parallel gripping arms 4a, 4b open. Turnaround/unload device 4 shuttles left and swing arm 10 shuttles right. Unit 13 rotates 180° to change position of load and unload chucks 1 and 5, and shuttle mechanism 12 moves swing arm 10 to left and turnaround/unload device 4 is moved forward. Parallel gripping arms 4a, 4b close on completed part, and unload chuck 5 opens. Swing arm 10 moves to right and turnaround/unload device 4 moves back and parallel gripping arms 4a, 4b drop part onto inspection transfer table 21 which according to how it is positioned either retains part on inspection transfer table 21 or transfers part to unload conveyor 20. Lathe completes running of the first end of a new part, and at this point in time load chuck 1 has a half completed and turned around part in it and unload chuck 5 is empty.

Lathe 7 stops and access door 9 is opened via air cylinder 18. Swing arm 10 is rotated by unit 11 to line up unload chuck 5 with lathe chuck 8. Shuttle mechanism 12 moves swing arm 10 to left and unload chuck 5 closes on completed part and lathe chuck 8 opens. Shuttle mechanism 12 moves swing arm to the right, and unit 13 rotates 180° to change position of load and unload chucks 1 and 5. Shuttle mechanism 12 moves swing arm 10 to left and load chuck 1 opens releasing new part while lathe chuck 8 closes on half completed part. Shuttle mechanism 12 moves swing arm 10 to right, and swing arm 10 is then rotated by unit 11 to line up load chuck 1 with turnaround/unload devices 4 and unload chuck 5 with feeder 2. Access door 47 closes via air cylinder 9 and lathe 7 begins running the second end of the half completed part.

Unit 13 rotates 180° to change position of load and unload chucks 1 and 5 and shuttle mechanism 12 moves swing arm 10 to left and turnaround/unload device 4 is moved forward or to right. Parallel gripping arms 4a, 4b close on half completed part, and unload chuck 5 opens. New part feeder 2 is moved to the right via linear way 3. Load chuck 1 closes on new part, and new part feeder 2 is moved back via linear way 3. Another new part is loaded via load chute 22 into part feeder 2. Shuttle mechanism 12 moves swing arm 10 to the right and the parts handling apparatus is now waiting for the lathe to finish the part.

What is claimed is:
1. A parts handling apparatus comprising
a main frame,
a parts feeder laterally movable along said main frame,
a parts turnaround device laterally moveable along said main frame,
a shuttle mechanism laterally movable along said main frame,
a swing arm mounted in said shuttle mechanism so as to be rotatable therein,
at least one arm chuck adapted to hold a part, said chuck being mounted near one end of said swing arm,
said swing arm capable of rotational movement from said parts feeder and parts turnaround device to a machining station, wherein two arm chucks are provided at the one end of said swing arm such that said swing arm can hold two parts, and an arm chuck rotating device to which said arm chucks are mounted adapted to rotate said chucks so as to interchange their positions at the one end of said swing arm.

2. The parts handling apparatus of claim 1 wherein said shuttle mechanism is laterally movable along said main frame so as to laterally move said swing arm and said chuck into and out of association with a parts holding chuck at said machining station when said swing arm is fully forwardly rotated.

3. The parts handling apparatus of claim 1 wherein said two arm chucks are positioned one each at said parts feeder and said parts turnaround device when said swing arm is fully rearwardly rotated.

4. The parts handling apparatus of claim 3 wherein said parts feeder and said parts turnaround device are laterally movable along said main frame into and out of association with said arm chucks when said swing arm is fully rearwardly rotated.

5. The parts handling device of claim 1 wherein said parts turnaround device comprises extended arms capable of grasping a part, and a base unit supporting said arms, said base unit capable of rotating said arms such that the part held therein is also rotated.

6. The parts handling device of claim 1 wherein said swing arm comprises a first section pivotally connected at one end thereof to a rotational unit mounted on said shuttle mechanism, a second section extending from said first section at an angle of less than 90°, and a third section extending from said second section at an angle of greater than 90°, said arm chuck mounted on said third section of said swing arm.

7. The parts handling device of claim 1
including a door covering an entrance to said machining station,
said door being mechanically openable to permit said swing arm and arm chuck to pass through said entrance to said machining station.

8. A method of parts handling comprising the steps of
loading a first part to be machined from a loading supply into a first arm chuck on a swing arm while said swing arm is at a loading station,
unloading a second part one end of which has been machined from a second arm chuck on said swing arm into a turnaround device while said swing arm is at said loading station,
rotating said swing arm from said loading station to a machining station, loading a third part both ends of which have been machined from a machining chuck into said second arm chuck on said swing arm, rotating said first and second arm chucks such that said first arm chuck is opposite said machining chuck, and unloading said first part to be machined from said first arm chuck into said machining chuck to have one end of said first part machined,
and rotating said swing arm from said machining station to said loading station.

9. The method of parts handling of claim 8 further comprising the steps of
rotating from end to end 180° the second part previously unloaded at said turnaround device and loading said second part into the empty first arm chuck,
rotating said first and second arm chucks, unloading the third part both ends of which have been machined from said second arm chuck into said turnaround device and dropping said third part onto a transfer table.

10. The method of parts handling of claim 9 further comprising the steps of
rotating said swing arm from said loading station to said machining station,
loading said first part one end of which has been machined into said second arm chuck from said machining chuck,
rotating said first and second arm chucks such that said first arm chuck is opposite said machining chuck and unloading said second part having one end machined from said first arm chuck to said machining chuck, to thereby have the second end of said second part machined,
and rotating said swing arm from said machining station to said loading station.

11. The method of parts handling of claim 10 further comprising the steps of rotating said first and second arm chucks such that said second arm chuck is opposite said turnaround unloading station, unloading said first part one end of which has been machined from said second arm chuck into said turnaround unloading station,
and loading a fourth unmachined part from said loading supply into said first arm chuck.

* * * * *